US008690434B2

(12) United States Patent
Desrosiers et al.

(10) Patent No.: US 8,690,434 B2
(45) Date of Patent: Apr. 8, 2014

(54) DAMPER ROLLER SYSTEM

(75) Inventors: Jean Desrosiers, St-Hippolyte (CA); Matthieu Pelchat, Blainville (CA)

(73) Assignee: Enertec Consultants Inc., Blainville (CA)

( * ) Notice: Subject to any disclaimer, the term of this patent is extended or adjusted under 35 U.S.C. 154(b) by 57 days.

(21) Appl. No.: 13/408,590

(22) Filed: Feb. 29, 2012

(65) Prior Publication Data

US 2012/0222267 A1 Sep. 6, 2012

Related U.S. Application Data

(60) Provisional application No. 61/448,343, filed on Mar. 2, 2011.

(51) Int. Cl.
*F16C 19/00* (2006.01)
*E05D 15/00* (2006.01)

(52) U.S. Cl.
USPC .................................................. 384/58; 16/91

(58) Field of Classification Search
USPC ............................ 384/18, 58, 449; 16/45, 91
See application file for complete search history.

(56) References Cited

U.S. PATENT DOCUMENTS

| | | | | |
|---|---|---|---|---|
| 2,047,468 | A | 7/1936 | Hagenbook | |
| 2,584,610 | A * | 2/1952 | Pearson | 105/154 |
| 2,861,850 | A * | 11/1958 | Nyblom | 384/542 |
| 4,993,328 | A * | 2/1991 | Wendt et al. | 105/150 |
| 5,291,630 | A | 3/1994 | Brown | |
| 5,302,030 | A * | 4/1994 | Buie et al. | 384/18 |
| 5,941,133 | A * | 8/1999 | Wierzba et al. | 74/570.2 |
| 6,280,097 | B1 * | 8/2001 | Mues et al. | 384/569 |
| 6,633,094 | B1 | 10/2003 | Andou | |
| 6,915,745 | B2 * | 7/2005 | Carder | 105/155 |
| 7,196,042 | B2 * | 3/2007 | Nakatani et al. | 508/391 |
| 2006/0147141 | A1 * | 7/2006 | Harwood et al. | 384/480 |

FOREIGN PATENT DOCUMENTS

| | | | |
|---|---|---|---|
| CA | 2015449 | A1 | 11/1990 |
| CA | 2040333 | A1 | 11/1991 |
| WO | 2006072318 | A1 | 7/2006 |
| WO | 2009081827 | A1 | 7/2009 |
| WO | 2009091132 | A2 | 7/2009 |
| WO | 2010044567 | A2 | 4/2010 |

* cited by examiner

*Primary Examiner* — James Pilkington
(74) *Attorney, Agent, or Firm* — Nath, Goldberg & Meyer; Jerald L. Meyer

(57) ABSTRACT

A damper roller system is provided. The system includes an external rotating element connected to a bearing housing. The bearing housing is filled with a viscous fluid and includes at least one bearing element immersed in the viscous fluid. The bearing housing is connected to at least one sealing element sealing the viscous fluid inside the bearing housing. The bearing element is connected to a non-rotating shaft having opposite first and second ends. The shaft is held in place at the first end by the bearing element and is rigidly connectable at the second end to an object. The first end is nail-shaped and immersed in the viscous fluid. A rotation of the external rotating element drives a common rotation of the bearing housing and of the bearing element, and shears the viscous fluid, causing a damping motion proportional to a rotational speed of the external rotating element.

15 Claims, 5 Drawing Sheets

DAMPER ROLLER SYSTEM

FIELD OF THE INVENTION

The present invention relates to the field of roller systems, and more particularly concerns a damper roller system, preferably for use with a sliding door.

BACKGROUND OF THE INVENTION

In the process of limiting the speed of the opening or closing of a door, the prior art generally addresses damping situations of rotating doors with a rotary-type damper, which is used in order to prevent a door to be closed abruptly by controlling its rotating force (U.S. Pat. No. 2,047,468, WO/2009/091132 and WO/2010/044567). For rotary doors applications, the prior art also provides a damper used to gradually close a door by employing high polymer viscous liquid and a return spring, wherein the door is automatically closed by the accumulated recovering force of the spring while a braking force is generated by the resistance of the high viscous liquid (CA 2,040,333). The prior art also addresses the control of motion of a door in one direction only by the resistance of viscous liquid (CA 2,015,449).

The damping of sliding doors may also be triggered by an evaluation and control unit, which determines the braking moment by evaluating a momentary door movement, detected by a sensory mechanism, and activates a damper of the doors in order to remain below a predefined maximum velocity (WO/2006/072318). The damping of a sliding door has also been addressed by the prior art by mounting a brake on the sliding door, therefore braking the closing motion of the sliding door by activating an oil damper (WO/2009/081827). The damping of a sliding door may also be achieved by a speed regulator managing the speed of a closing door (U.S. Pat. No. 6,633,094). Door damping has also been demonstrated by cylinders containing oil and pistons. When the door opens, oil is drawn into a cylinder. When the door closes, the oil is expulsed from the cylinder through an orifice, therefore controlling the closing speed of the door (U.S. Pat. No. 5,291,630).

Other existing sliding door systems are based on air-type damping cylinders for the function of damping the movement of the door equipment at the end of stroke.

Sliding doors are often found on railcars, buses, airplanes, mining equipment, cars, and other types of vehicles, as well as in various stationary applications in all sorts of properties (e.g. residential, industrial, or commercial settings). A general problem that is often present on equipment provided with sliding doors arises when a sliding door is moving rapidly. This problem may occur in various circumstances, for example, but not limited to, while a vehicle is in motion or when an excessive force is applied to open or close a sliding door. Most sliding doors are currently suspended on friction-free rollers. A friction-free roller is an element that allows a sliding door to slide freely. In the particular example of a moving vehicle, if a sliding door panel is unlatched and free to slide while the vehicle is changing speed, the resulting movement of the unlatched door panel will be in a direction opposite to that of the vehicle, thereby causing the door panel to accelerate until the end of stroke.

This undesired door motion creates both a safety hazard and a mechanical hazard. The safety hazard occurs, for example, when a heavy door accelerates and rams into people, animals or objects, while the mechanical hazard occurs when a heavy door accelerates and rams into an end-of-travel device thereof. Hence, during heavy acceleration or deceleration of a vehicle, unlatched sliding doors will move and accelerate in a direction opposite to that of the vehicle. An unlatched sliding door thus poses an increased risk of violently hitting a passenger, an animal, an object or the end-of-travel device thereof, thereby possibly injuring beings or damaging itself and its surroundings in the process.

In view of the above considerations, there is therefore a need for a roller system that is able to act as a damper when a door panel speed increases and to impose an increasing braking force thereon while remaining friction-free at low speeds.

SUMMARY OF THE INVENTION

An object of the present invention is to provide a system that addresses at least one of the above-mentioned needs.

In accordance with an aspect of the present invention, there is provided a damper roller system comprising:

an external rotating element;

a bearing housing connected to said external rotating element, the bearing housing being filled with a viscous fluid and comprising at least one bearing element immersed in said viscous fluid;

at least one sealing element connected to the bearing housing and sealing the viscous fluid thereinside; and a non-rotating shaft having opposite first and second ends, the non-rotating shaft being held in place at said first end thereof by the at least one bearing element and being rigidly connectable at said second end thereof to an object, said first end being substantially nail-shaped and immersed in said viscous fluid, whereby a rotation of the external rotating element drives a common rotation of the bearing housing and the at least one bearing element comprised therein, and shears the viscous fluid, said rotation of the external element being damped substantially proportionally to a rotational speed thereof.

Preferably, the external rotating element slides and rotates along a stationary door track and the object is a sliding door apparatus.

Advantageously, the damper roller system of the present invention acts as a damper when a speed of the object increases. Indeed, the damper roller system of the present invention is friction-free at low speeds, but imposes an increasing braking force on the objet as the speed thereof increases, the braking force being provided by the common action of the bearing housing, the viscous fluid, the at least one bearing element, and the non-rotating shaft.

The damper roller system according to the present invention having the abovementioned structure has the following effects as described hereinbelow.

Firstly, when the external rotating element rotates, the movement of the at least one bearing element immersed in the viscous fluid generates a resistance without requiring any other external speed control apparatus. The resistance level depends on whether the external rotating element rotates at high speed, where the resistance will be higher, or at low speed, where the resistance will not be perceivable.

Secondly, when the external rotating element rotates, the rotary movement thereof against the first end of the non-rotating shaft, which is nail-shaped and immersed in the viscous fluid, generates a resistance without requiring any other external speed control apparatus. The resistance level depends on whether the external rotating element rotates at high speed, where the resistance will be higher, or at low speed, where the resistance will not be perceivable.

Thirdly, when the damper roller system of the present invention is used in a sliding door apparatus, providing a damping motion in the external rotating element itself, instead of adding an additional external damping system, contributes to reducing the overall cost of the sliding door apparatus. As a result, eliminating the need for an additional external damping system eliminates the cost of buying such additional damping systems as well as the maintenance costs associated therewith.

Fourthly, the simplicity of the invention makes the installation and general maintenance thereof easier and more affordable than existing systems.

Fifthly, by providing at least one sealing element to ensure that the viscous fluid remains confined inside the bearing housing, the present invention contributes to preventing deterioration of damping performance caused by frequent usage, thereby maintaining a stable damping performance. Further, by preventing leakage of the viscous fluid, the present invention ensures that the surroundings of the damper roller system are not dirtied by the viscous fluid. Additionally, the at least one sealing element helps keep the bearing housing exempt of dirt and other contaminants and thus ensures that the damper roller system exhibits stable performance for longer periods of time.

Sixthly, the composition of the viscous fluid and the dimensions and materials used for the components of the damper roller system (e.g. external rotating element, bearing housing and elements, non-rotating shaft, etc.), may be adapted to fit various types of objects, thereby resulting in an extremely polyvalent invention.

Finally, by filling the bearing housing with viscous fluid and by sealing the viscous fluid thereinside, the damper roller system according to embodiments of the present invention provides a more stable and reliable damping motion of movable objects such as sliding doors. This improved stability and reliability is essential in the transportation industry, and would prove very valuable in the general door industry, especially in the sliding doors industry.

Other features and advantages of the present invention will be better understood upon reading of preferred embodiments thereof, provided merely by way of non-limitative examples, and upon referring to the appended drawings.

Figure 1:
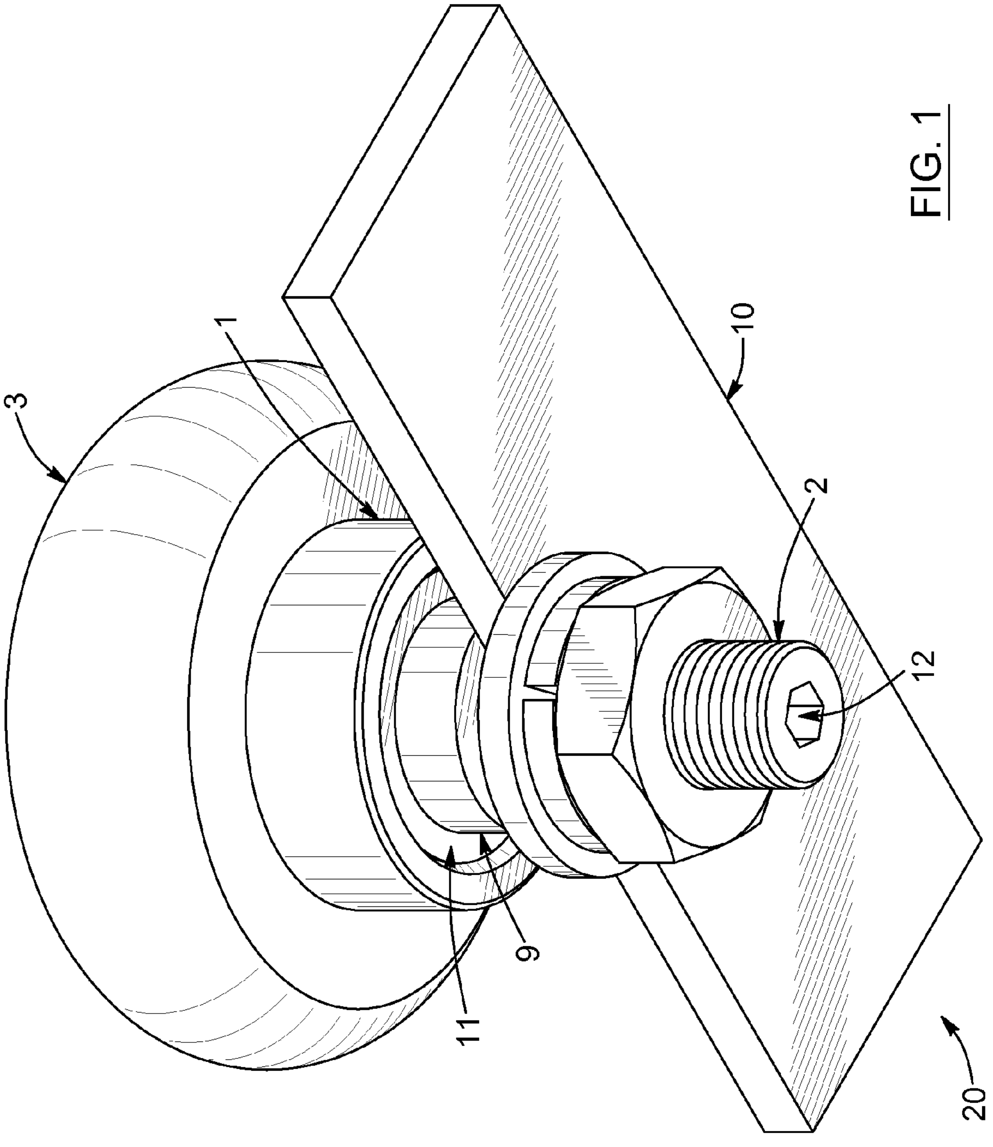
FIG. 1 is a perspective view of the damper roller system according to an embodiment of the present invention.

While the invention will be described in conjunction with example embodiments, it will be understood that it is not intended to limit the scope of the invention to such embodiments. On the contrary, it is intended to cover all alternatives, modifications and equivalents, as may be included in the present description.

DETAILED DESCRIPTION OF PREFERRED EMBODIMENTS

In the following description, similar features in the drawings have been given similar reference numerals and in order to weigh down the figures, some elements are not referred to on some figures if they were already identified in preceding figures.

In accordance with one aspect of the invention, there is provided a damper roller system. More particularly, the invention preferably concerns a rotary damper roller system used to control the speed of an object during an opening or closing motion thereof. In some embodiments of the invention, the object is a movable object such as a door apparatus, for example a sliding door panel. However, it is to be noted that the present invention is not limited to door applications and could be used in many other contexts. Indeed, in some embodiments, the object could be a safety belt whose speed would be controlled by the damper roller system of the present invention, for example during heavy breaking or acceleration of vehicle.

The damper roller system according to the present invention includes three main components: an external rotating element or rotating roller; a shaft; and a bearing housing comprising at least one bearing element. First, in some embodiments, when a door panel opens and closes in a lateral fashion, it is often supported by an external rotating element. For example, in some embodiments of the invention, the object is supported by the damper roller system via the external rotating element which sits and rotates back and forth inside a stationary door track. Second, the shaft holds the object and does not rotate because it is rigidly attached (preferably bolted) to it. Third, the bearing housing and the at least one bearing element comprised therein connect rotatably the external rotating element to the non-rotating shaft.

Preferably, the basic function of the damper roller system of the present invention is to allow smooth opening and closing of an object. In the present invention, the speed of the object is controlled, on the one hand, by the resistance arising due to the rotation of each bearing element immersed in the viscous fluid filling the gap between the bearing housing and the nail-shaped end of the non-rotating shaft and, on the other hand, by the flow resistance created by the viscous fluid itself during the rotation of the bearing housing against the non-rotating shaft. Preferably, these combined two damping mechanisms help prevent an abrupt closing of a door apparatus, for example, on a person, an animal or an object, as well as preventing an abrupt opening of a door attached to a door support. As illustrated by FIGS. 1-8, the term "nail-shaped, "describes a structure having a flanged head axially attached to a shaft, and the flanged head has a larger diameter than that of the shaft.

As opposed to the present invention, the prior art related to damping systems for sliding doors is disadvantageous, inasmuch as, typically, a plurality of elements often must be activated in order for the damping motion to be executed. Such elements may include, without limitation, a spring, a sensory mechanism, a brake mounted on the door apparatus activated by a separate entity, cylinder and pistons, and the like. Thus, as the structure of damping systems becomes more complicated, so does the assembly process thereof, thereby leading to a decrease in productivity. Additionally, the fabrication cost also increases due to this often complicated structure. Furthermore, while the air-type damping systems actually frequently used in moving vehicles operate adequately at low speeds, they do not at high speeds where, due to the fact that air itself is compressible, damping characteristics are either very limited or absent at higher speeds.

Referring to FIGS. 1-8, there is shown a damper roller system 20 for an object 10 according to a preferred embodiment of the invention. In the illustrated embodiment, the object 10 is a sliding door apparatus. However, as mentioned above, the present invention is not restricted to door applications and can be used in many other contexts and for both a movable and a stationary object 10. The damper roller system 20 includes an external rotating element 3, a bearing housing 1 including at least one bearing element 4, at least one sealing element 5 and a non-rotating shaft 2, as shown, for instance, in FIGS. 2 and 6. These elements will be described in further detail below.

The damper roller system 20 first includes an external rotating element 3. As mentioned above, when object 10 moves, the external rotating element 3 rotates, preferably but not necessarily, inside a stationary door track (not shown). The external rotating element 3 can be embodied by any appropriate rotating device allowing the transmission of a sufficiently strong rotational force therefrom to a contacting surface, which can include, without being limited to, a wheel, a gear, a pulley and a toothed disc. Preferably, the external rotating element 3 can be made of a metal or a plastic material, for example polyurethane or rubber.

Figure 6:
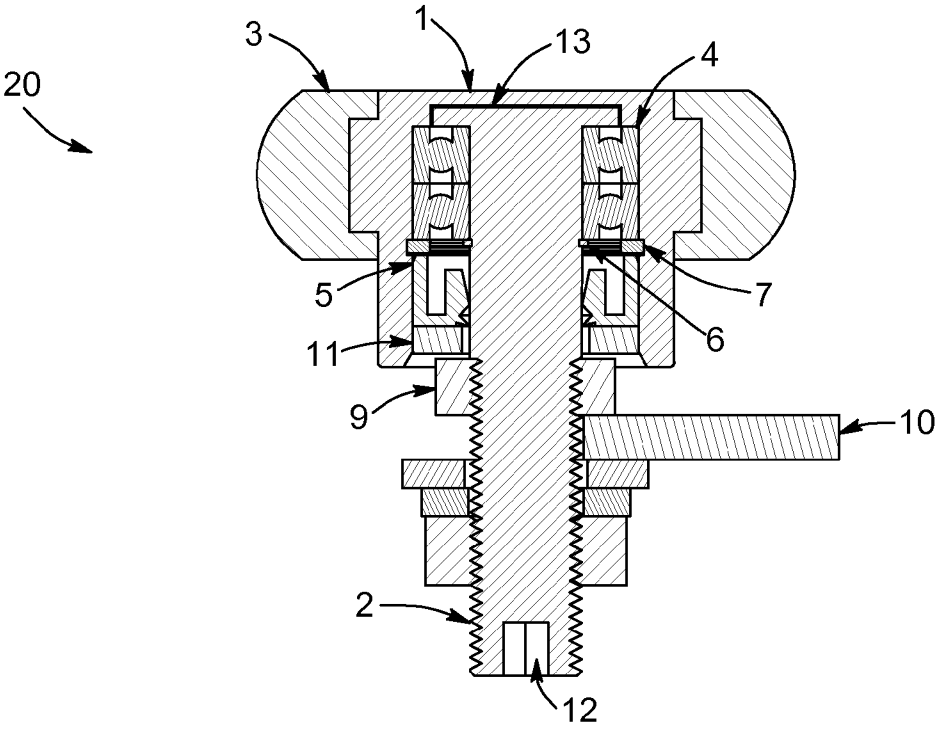
FIG. 6 is a sectional view of the damper roller system of FIG. 4 taken along line VI-VI.
Figure 7:
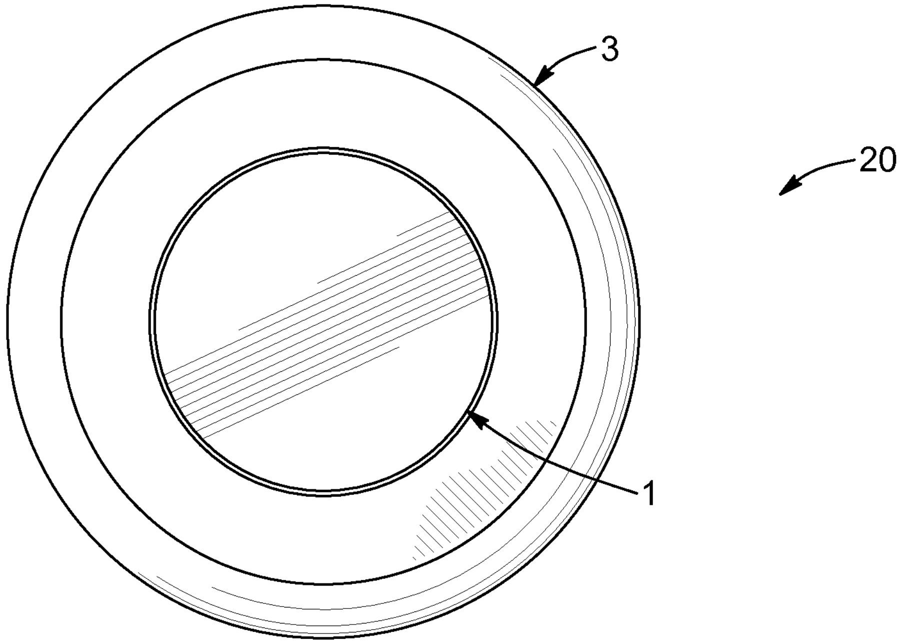
FIG. 7 is a top elevation view of the damper roller system shown in FIG. 1 without an object connected to the second end of the non-rotating shaft.
Figure 8:
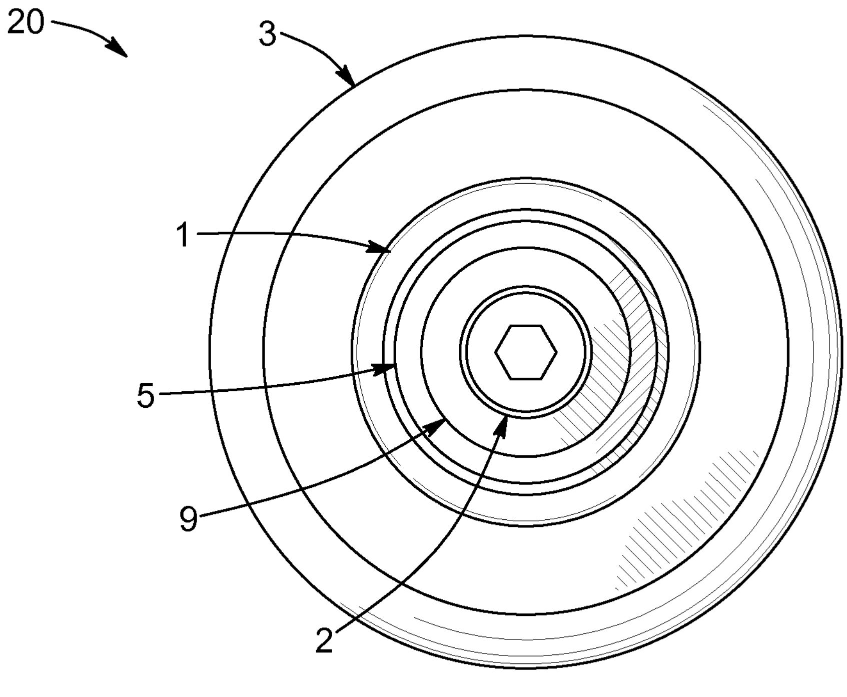
FIG. 8 is a bottom elevation view of the damper roller system shown in FIG. 7.

Referring again to FIGS. 1-8, the damper roller system 20 also includes a bearing housing 1 connected to the external rotating element 3. In some embodiments of the invention, the external rotating element 3 is molded onto the bearing housing 1. The bearing housing 1 is filled with a viscous fluid (not shown) and includes at least one bearing element 4 immersed in the viscous fluid. Although two bearing elements are shown in the embodiments of FIGS. 2 and 6, it should be appreciated by those skilled in the art that any appropriate number of bearing elements can be used. Preferably, the viscous fluid can be made of any suitable lubricating viscous fluid including, without limitation, a silicone fluid, a petroleum-based fluid and a synthetic fluid. Also preferably, the bearing housing 1 and each bearing element 4 are made of a metal or a plastic material. Additionally, in some embodiments of the invention, each bearing element 4 is held in place by internal and external snap rings 6 and 7, such as shown in FIGS. 2 and 6. Preferably, the internal and external snap rings 6 and 7 are made of a stamped alloy material or a plastic material.

In some embodiments of the invention, each bearing element 4 is a rolling-element bearing, preferably a ball bearing, including an outer race, an inner race disposed concentrically inside the outer race, and a plurality of rolling elements (i.e. balls for ball bearings) disposed between the inner and outer races. The plurality of rolling elements rotate along a circular path concentric with the inner and outer races, and are immersed in the viscous fluid, the viscous fluid thereby damping and slowing down the rotation of the bearing elements rotating between the inner and outer races. It should be emphasized that, besides ball bearings, other types of rolling-element bearings, such as, for example, cylindrical roller bearings, tapered roller bearings, needle bearings and spherical roller bearings, could be used as bearing elements 4. In other embodiments, journal bearings could alternatively be used as bearing elements 4.

In some of these embodiments, the outer race of each bearing element 4 is pressed onto the bearing housing 1, while the inner race is pressed onto the non-rotating shaft 2 introduced above and described in more detail below. In such embodiments, the outer race of each bearing element 4 and the bearing housing 1 rotate together with the external rotating element 3 when the object 10 moves. Alternatively, in other embodiments, it may be the inner race of each bearing element 4 that is connected to the bearing housing 1, which must then be equipped with a center supporting pin. Moreover, in such embodiments, the non-rotating shaft 2 would need to be of tubular shape.

Figure 2:
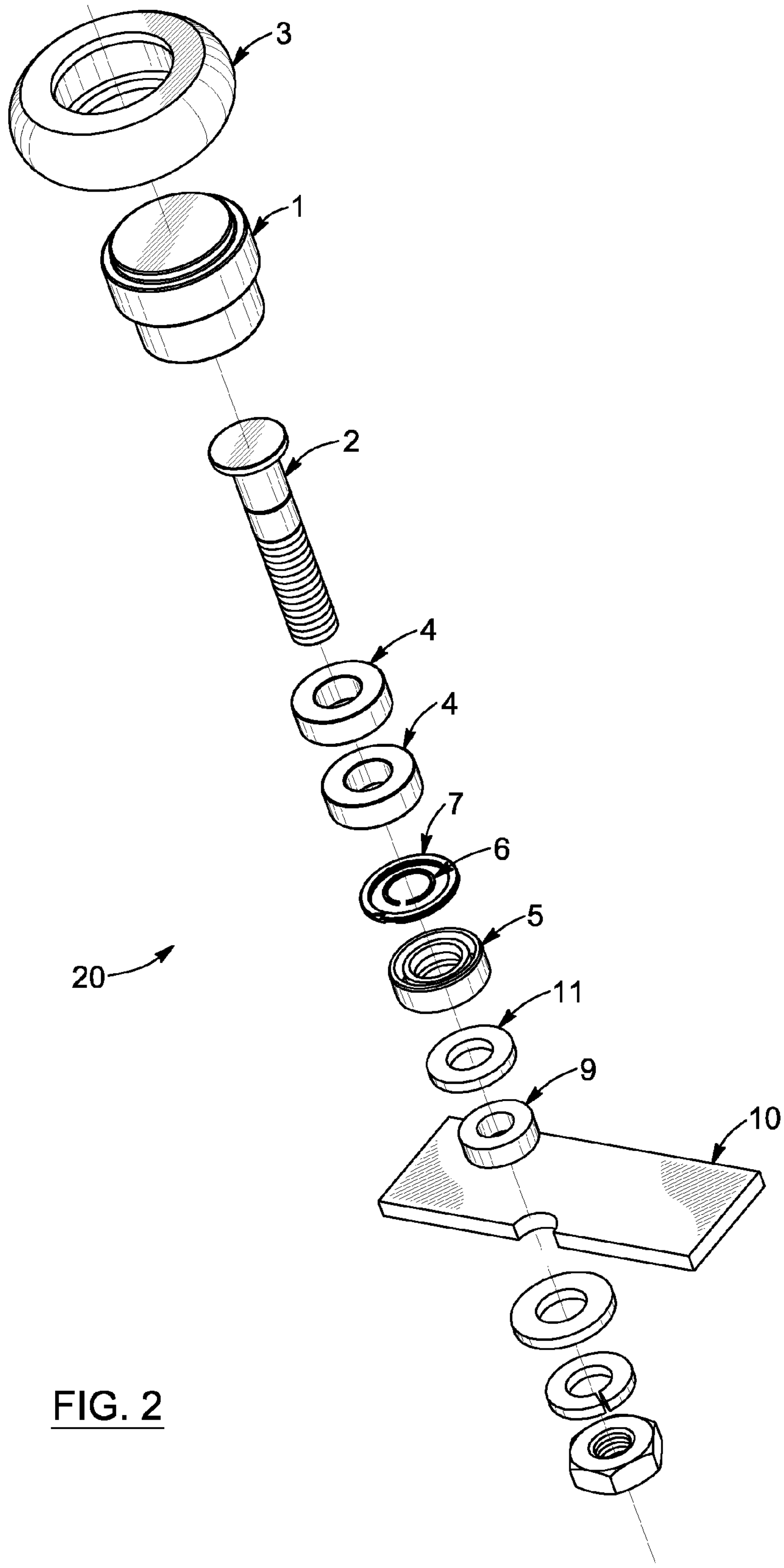
FIG. 2 is an exploded perspective view of the damper roller system shown in FIG. 1.
Figure 3:
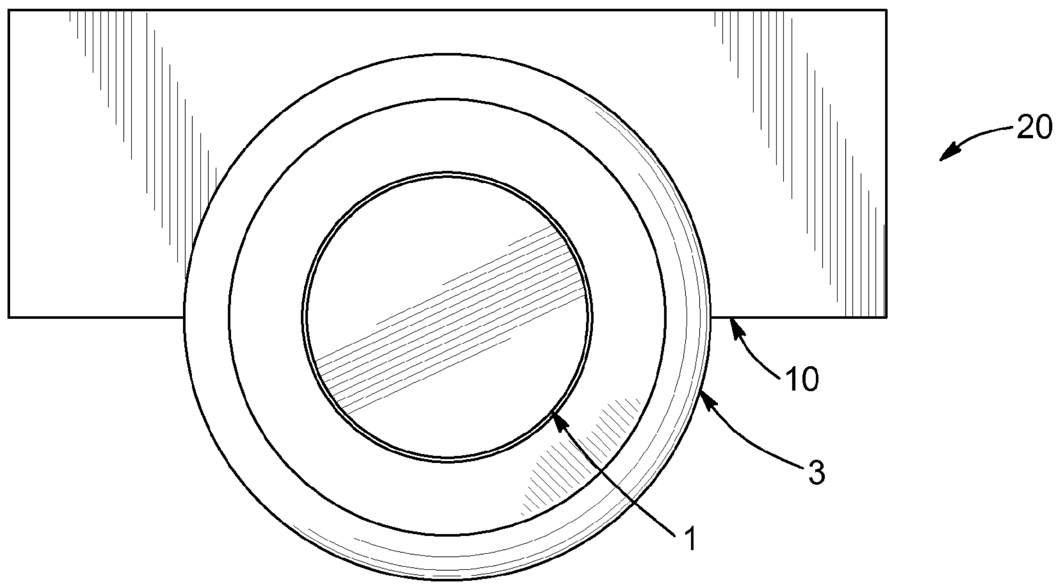
FIG. 3 is a top elevation view of the damper roller system shown in FIG. 1.
Figure 4:
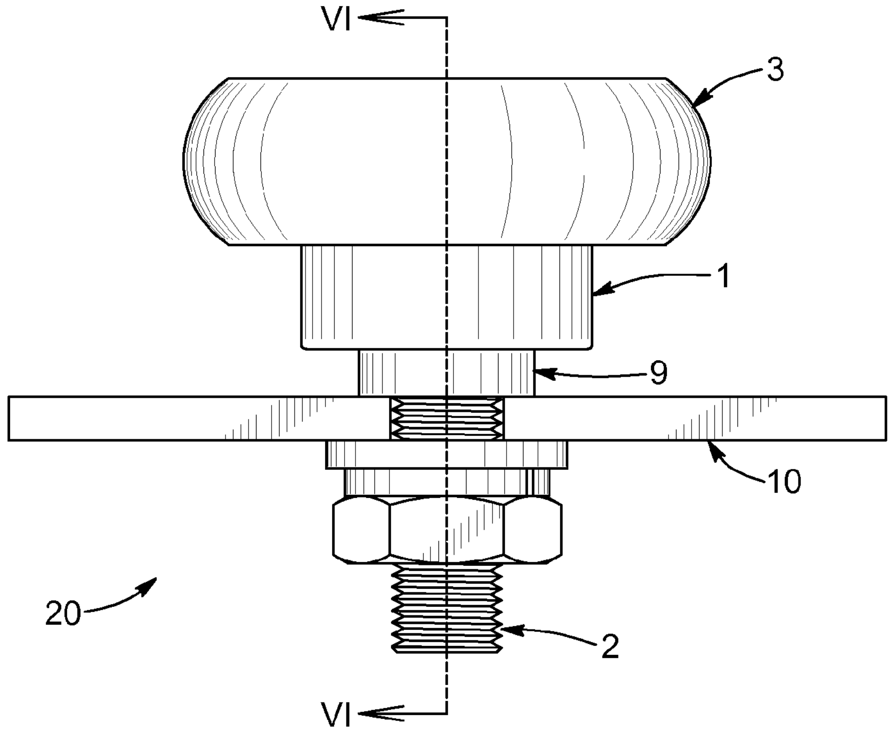
FIG. 4 is a side elevation view of the damper roller system shown in FIG. 1.
Figure 5:
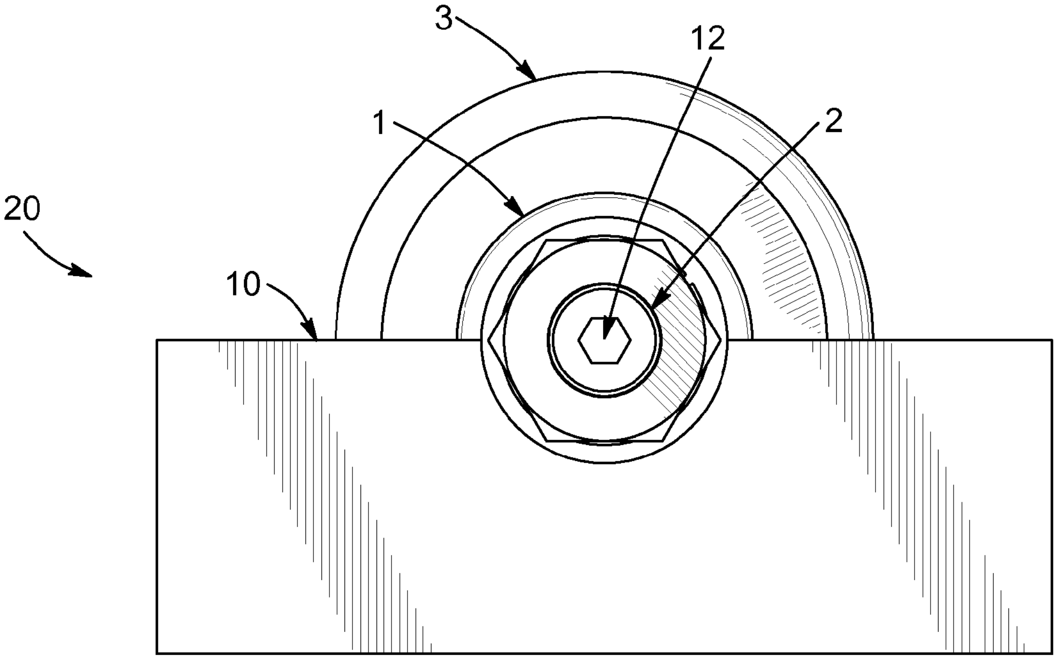
FIG. 5 is a bottom elevation view of the damper roller system shown in FIG. 1.

The damper roller system 20 shown in FIGS. 1-8 further includes at least one sealing element 5 connected to the bearing housing 1 and sealing the viscous fluid thereinside. In some embodiments, the sealing element 5 includes a double lip seal or at least one O-ring 11, such as shown in FIGS. 1, 2 and 6. Preferably, the sealing element 5 is made of a stamped allow material, a thermoplastic resin, a homopolymer, or a synthetic rubber. For example, these materials may include, without being limited to, EPDM rubber, Viton®, Neoprene, and Kalrez®.

Still referring to FIGS. 1-8, the damper roller system 20 according to the present invention further includes a non-rotating shaft 2 having opposite first and second ends. The non-rotating shaft 2 is held in place at the first end 13 thereof by the at least one bearing element 4 disposed inside the bearing housing 1 and is rigidly connectable at the second end thereof to an object 10, which is embodied by a sliding door apparatus in the embodiment illustrated in FIGS. 1-8. The first end 13 of the non-rotating shaft 2 is substantially nail-shaped, as shown in FIG. 6, and is immersed in the viscous fluid filling the bearing housing 1. In embodiments of the invention, the non-rotating shaft 2 is thus the component that does not rotate during the motion of the object 10 since the non-rotating shaft 2 is strongly connected to the object 10 (preferably bolted). Preferably, the non-rotating shaft 2 is made of a metal, an alloy (e.g. steel) or a plastic material. Also preferably, the second end of the non-rotating shaft 2 includes a tool interface portion 12, which can be hexagonal in shape, for engaging a tool and hence facilitating assembly of the non-rotating shaft 2 to the other components of the damper roller system 20.

Preferably, the damper roller system 20 further includes a standoff element 9 connected around the non-rotating shaft 2 and extending therealong between the bearing housing 1 and the object 10, as shown in FIGS. 1-8. The standoff element 9 protects the rotating components of the damper roller system 20 and contributes to prevent friction between the non-rotating and rotating components of the damper roller system 20.

During an operation of the damper roller system 20 of the present invention, a rotation of the external rotating element 3 drives a common rotation of the bearing housing 1 and of each bearing element 4 included therein, and shears the viscous fluid, the rotation of the external rotating element 3 being damped substantially proportionally to a rotational speed thereof. Hence, as mentioned above, the damping strength provided by the damper roller system 20 according to embodiments of the invention increases as the rotational speed of the external rotating element 3, increases.

Preferably, when the object 10 opens or closes by a lateral movement thereof, the external rotating element 3 rotates and drives a rotational movement of each bearing element 4 immersed in the viscous fluid, thereby causing an important damping motion at higher speed of the object 10, whereas little resistance is observed at lower speed thereof. In particular, the at least one bearing element 4 preferably provides, through lubrication thereof in contact with the highly viscous fluid, a resisting torque controlling the speed of the object 10, while at the same time supporting the object 10 through the non-rotating shaft 2. Also preferably, the present invention further provides an additional damping mechanism arising from the rotation of the bearing housing 1 filled with the viscous fluid and surrounding the nail-shaped first end 13 of the non-rotating shaft 2. Indeed, according to this mechanism, a resistive torque is created due to the presence of the viscous fluid in the tight space existing between the rotating bearing housing 1 and the fixed, nail-shaped end 13 of the non-rotating shaft 2. Furthermore, due to its shape, the first end 13 of the non-rotating shaft 2 also helps mixing the viscous fluid, thereby contributing to the creation of a damping effect. The dampers used in the present invention indeed offer improved lateral load support.

Furthermore, embodiments of the present invention preferably integrate various functions including, without being limited to: prevention of door slamming, control of door displacement speed and support of the door.

Preferred embodiments of the present address, by way of a simple damper roller system, issues related to passenger and material protection by controlling respectively the closing speed and the opening speed of a sliding door panel. Also preferably, the damper roller system according to the present invention provides a simpler way of damping the closing and opening of sliding doors in moving vehicles, thereby addressing both productivity of the transportation industry and lowering the costs of managing such damping systems.

It is also important to note that the construction and arrangement of the elements of the damper roller system as shown in the preferred and other embodiments are illustrative only. Although only a few embodiments of the present invention have been described in detail in this disclosure, those skilled in the art who review this disclosure will readily appreciate that many modifications are possible (e.g. variations in sizes, dimensions, structures, shapes, proportions, type of viscous fluid) without materially departing from the novel teachings and advantages of the present invention. For example, the size of the external rotating element and of the nail-shaped end of the non-rotating shaft, as well as the number of bearing elements included in the bearing housing may vary, but all such modifications are intended to be included within the scope of the present invention. The phraseology and terminology used herein is for the purpose of the description and should not be regarded as limiting. Other substitutions, modifications changes or omissions may be made in the design, operating conditions and arrangement of the preferred and other exemplary embodiment without departing from the scope of the present invention.

The invention claimed is:

1. A damper roller system comprising:

an external rotating element;

a bearing housing connected to said external rotating element, the bearing housing being filled with a viscous fluid and comprising at least one bearing element immersed in said viscous fluid;

at least one sealing element connected to the bearing housing and sealing the viscous fluid thereinside; and a non-rotating shaft having opposite first and second ends, the non-rotating shaft being held in place at said first end thereof by the at least one bearing element and being rigidly connectable at said second end thereof to an object, said first end being substantially nail-shaped having a flanged head enclosed within the bearing housing, the nail-shaped first end being surrounded by the viscous fluid, and the nail-shaped first end extending radially outwardly beyond a radially innermost portion of each of the at least one bearing element, wherein the nail-shaped first end and the bearing housing define a space filled with the viscous fluid, and whereby a rotation of the external rotating element drives a common rotation of the bearing housing and of the at least one bearing element comprised therein, and shears the viscous fluid at least within the space, said rotation of the external rotating element being damped substantially proportionally to a rotational speed thereof.

2. The damper roller system according to claim 1, wherein the external rotating element is one of a wheel, a gear and a pulley.

3. The damper roller system according to claim 1, wherein the external rotating element is molded onto the bearing housing.

4. The damper roller system according to claim 1, wherein the external rotating element is made of one of a metal and a plastic material.

5. The damper roller system according to claim 1, wherein each of the at least one bearing element is a rolling-element bearing comprising:

an outer race;

an inner race disposed concentrically inside said outer race; and a plurality of rolling elements disposed between said inner and outer races and rotating along a circular path concentric therewith, the plurality of rolling elements being immersed in the viscous fluid.

6. The damper roller system according to claim 5, wherein the outer race is connected to the bearing housing and wherein the inner race is connected to the non-rotating shaft.

7. The damper roller system according to claim 1, wherein each of the at least one bearing element is held in place by an internal snap ring and an external snap ring.

8. The damper roller system according to claim 7, wherein the internal and the external snap rings are made of one of a stamped alloy material and a plastic material.

9. The damper roller system according to claim 1, wherein the bearing housing and the at least one bearing element are made of one of a metal and a plastic material.

10. The damper roller system according to claim 1, wherein the at least one sealing element comprises one of a double lip seal and at least one O-ring.

11. The damper roller system according to claim 1, wherein the at least one sealing element is made of one of a stamped alloy material, a thermoplastic resin, a homopolymer, and a synthetic rubber.

12. The damper roller system according to claim 1, wherein the non-rotating shaft is made of one of a metal, an alloy and a plastic material.

13. The damper roller system according to claim 1, wherein the viscous fluid is made of one of a silicone fluid, a petroleum-based fluid, and a synthetic fluid.

14. The damper roller system according to claim 1, further comprising a standoff element connected around the non-rotating shaft and extending therealong between the bearing housing and the object.

15. The damper roller system according to claim 1, wherein the second end of the non-rotating shaft comprises a tool interface portion for engaging a tool.

* * * * *